(12) United States Patent
Kudo et al.

(10) Patent No.: US 9,025,012 B2
(45) Date of Patent: May 5, 2015

(54) DISPLAY CONTROL DEVICE, DISPLAY CONTROL METHOD, AND PROGRAM

(75) Inventors: Yusuke Kudo, Kanagawa (JP); Takashi Kitao, Tokyo (JP); Ryo Fukazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 918 days.

(21) Appl. No.: 13/221,870

(22) Filed: Aug. 30, 2011

(65) Prior Publication Data

US 2012/0056883 A1 Mar. 8, 2012

(30) Foreign Application Priority Data

Sep. 7, 2010 (JP) ................................ P2010-200152

(51) Int. Cl.
*H04N 13/04* (2006.01)
*H04N 13/00* (2006.01)

(52) U.S. Cl.
CPC ....... *H04N 13/0025* (2013.01); *H04N 13/0029* (2013.01)

(58) Field of Classification Search
USPC ..................................................... 348/42–60
See application file for complete search history.

(56) References Cited

FOREIGN PATENT DOCUMENTS

| JP | 07-143524 | | 6/1995 | |
|----|-----------|---|--------|---|
| JP | 07143524 A | * | 6/1995 | ............. H04N 15/00 |
| JP | 2012049920 A | * | 3/2012 | |

* cited by examiner

*Primary Examiner* — Dave Czekaj
*Assistant Examiner* — Shanika Brumfield
(74) *Attorney, Agent, or Firm* — Sherr & Jiang, PLLC

(57) ABSTRACT

There is provided a display control device including an image adjustment unit for taking, in a case one object image among an object image for a right eye to be observed by a right eye of a viewer and an object image for a left eye to be observed by a left eye of the viewer includes a non-matching portion not matching an other object image, the non-matching portion as an adjustment target image that is a target of adjustment, and adjusting the adjustment target image to be an image less clear than a base image that is the adjustment target image before adjustment, and a display control unit for performing control of stereoscopically displaying an object based on an object image after adjustment that is the one object image that has been adjusted by the image adjustment unit and the other object image.

18 Claims, 13 Drawing Sheets

FIG.11A          FIG.11B
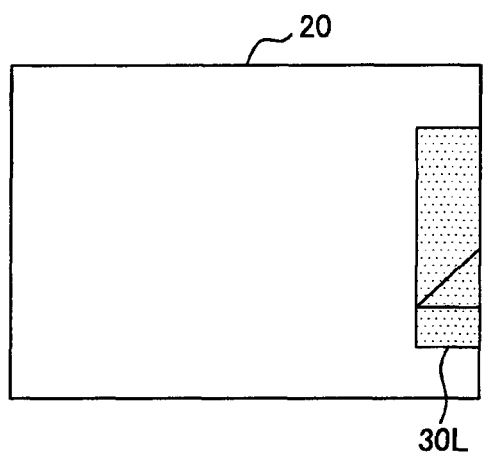
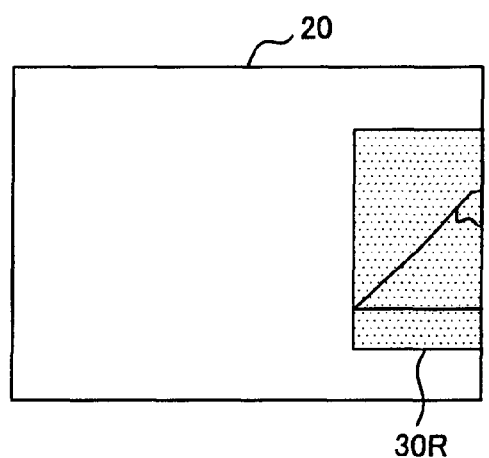

DISPLAY CONTROL DEVICE, DISPLAY CONTROL METHOD, AND PROGRAM

BACKGROUND

The present disclosure relates to a display control device, a display control method, and a program.

A stereoscopic display device for stereoscopically displaying an object (for example, a tree) has been known for a while. The stereoscopic display device stereoscopically displays an object by displaying an object image for a left eye to be observed only by a left eye of a viewer and an object image for a right eye to be observed only by a right eye of the viewer while shifting relative to each other their display positions on a display screen.

Now, when one object image among the object image for a left eye and the object image for a right eye extends to an end portion on the left or right of the display screen, a non-matching portion that does not match that object image may occur in the other object image. This non-matching portion occurs at one of the end portions on the left and right of the display screen.

In such a case, since a parallax is not applied to the non-matching portion, there is a possibility that it becomes hard for the viewer to stereoscopically view the non-matching portion. Thus, there is a possibility that some viewers may experience an odd feeling towards the non-matching portion, and, further, towards a stereoscopic object image which is the stereoscopically displayed object.

In relation to such an issue, the technology described in JP H7-143524A (hereinafter, patent document 1) causes floating windows in which no object image is drawn to be displayed at the left and right end portions of the display screen. The non-matching portion ceases to be displayed owing to such floating windows, and, thus, an odd feeling towards the stereoscopic object image is reduced.

SUMMARY

However, a floating window is dark-coloured (for example, black), and if the surroundings of the stereoscopic display device are bright (for example, if the stereoscopic display device is placed in a bright room), there is a possibility that the floating window does not fit into the surroundings. Accordingly, there is a possibility that a viewer experiences an odd feeling towards the floating window.

As described, with the technology described in patent document 1, there is an issue that there is a case where a viewer experiences an odd feeling towards the floating window.

In light of the foregoing, it is desirable to provide a display control device, a display control method and a program which are novel and improved, and which are capable of reducing an odd feeling towards a stereoscopic object image.

According to an embodiment of the present disclosure, there is provided a display control device which includes an image adjustment unit for taking, in a case one object image among an object image for a right eye to be observed by a right eye of a viewer and an object image for a left eye to be observed by a left eye of the viewer includes a non-matching portion not matching an other object image, the non-matching portion as an adjustment target image that is a target of adjustment, and adjusting the adjustment target image to be an image less clear than a base image that is the adjustment target image before adjustment, and a display control unit for performing control of stereoscopically displaying an object based on an object image after adjustment that is the one object image that has been adjusted by the image adjustment unit and the other object image.

The image adjustment unit may adjust the adjustment target image in a case the object is stereoscopically displayed on a side nearer to the viewer than display positions of the object image after adjustment and the other object image.

The image adjustment unit may increase a degree of unclearness of each section in the adjustment target image as a distance to the each section from a matching portion, in the one object image, matching the other object image is greater.

The image adjustment unit may include, in the adjustment target image, at least a part of a matching portion, in the one object image, matching the other object image.

The image adjustment unit may include, in the adjustment target image, a portion, in the matching portion, near the non-matching portion.

The image adjustment unit may include, in the adjustment target image, all of the one object image and the other object image.

The image adjustment unit may adjust the adjustment target image to be an image less clear than the base image by causing at least one of transparency and intensity of blur of the adjustment target image to be greater than that of the base image.

According to another embodiment of the present disclosure, there is provided a display control method which includes taking, in a case one object image among an object image for a right eye to be observed by a right eye of a viewer and an object image for a left eye to be observed by a left eye of the viewer includes a non-matching portion not matching an other object image, the non-matching portion as an adjustment target image that is a target of adjustment, and adjusting the adjustment target image to be an image less clear than a base image that is the adjustment target image before adjustment, and performing control of stereoscopically displaying an object based on an object image after adjustment that is the one object image that has been adjusted and the other object image.

According to another embodiment of the present disclosure, there is provided a program for causing a computer to realize an image adjustment function of taking, in a case one object image among an object image for a right eye to be observed by a right eye of a viewer and an object image for a left eye to be observed by a left eye of the viewer includes a non-matching portion not matching an other object image, the non-matching portion as an adjustment target image that is a target of adjustment, and adjusting the adjustment target image to be an image less clear than a base image that is the adjustment target image before adjustment, and a stereoscopic image display control function of stereoscopically displaying an object based on an object image after adjustment that is the one object image that has been adjusted by the image adjustment function and the other object image.

According to the embodiments of the present disclosure described above, it is possible to reduce an odd feeling towards a stereoscopic object image.

BRIEF DESCRIPTION OF THE DRAWINGS

FIGS. 11A and 11B are explanatory diagrams showing examples of an object image for a right eye and an object image for a left eye displayed by a display control device according to a third embodiment;

DETAILED DESCRIPTION OF THE EMBODIMENT(S)

Figure 1:
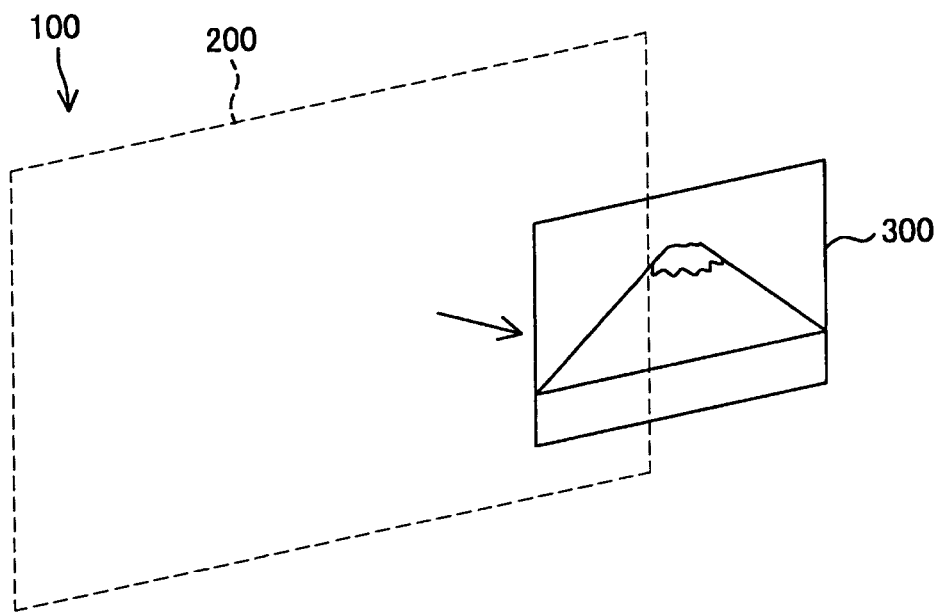
FIG. 1 is an explanatory diagram showing an example of a case where an object image is stereoscopically displayed on the side of a viewer than a display screen of a display.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, an explanation will be given in the following order.

1. Consideration on Non-Matching Portion
2. First Embodiment (Example of Process of Increasing Transparency of Non-Matching Portion)
3. Second Embodiment (Example of Process of Increasing Transparency of Not Only Non-Matching Portion But Also Matching Portion)
4. Third Embodiment (Example of Process of Increasing Transparency of Non-Matching Portion in Stages)
5. Fourth Embodiment (Example of Process of Increasing Transparency of Both Object Images)
6. Hardware Configuration <1. Consideration on Non-Matching Portion>

Figure 2:
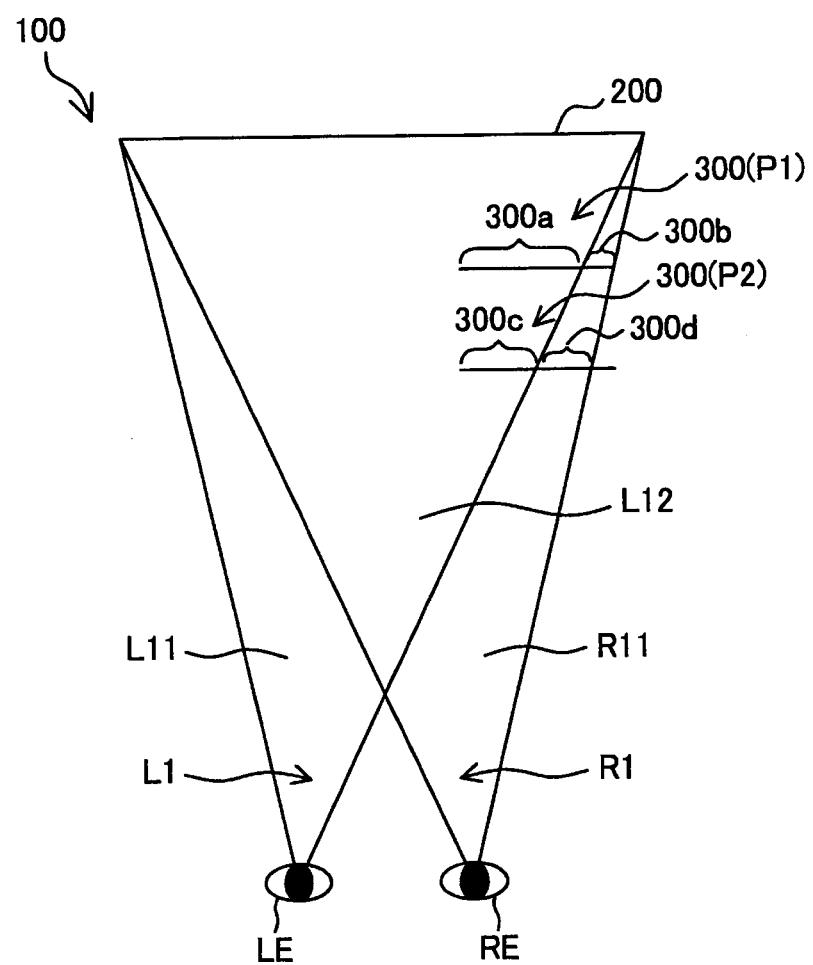
FIG. 2 is a plan view for describing a reason a non-matching portion occurs.

The present inventors have given consideration on a non-matching portion. First, the consideration given is described in detail based on FIGS. 1, 2, 3A and 3B. FIG. 1 shows a state where a general stereoscopic display device 100 stereoscopically displays an object 300 (a mountain in this case) forward out of a display screen 200 (nearer on the side of a viewer). FIG. 2 shows a state where a left eye LE and a right eye RE of a viewer are observing the display screen 200. The object according to the present disclosure is a concept including, in addition to a physical substance (for example, a tree, a car, a mountain, or the like), an image such as an icon. To stereoscopically display means to display an object in such a way that stereoscopic viewing by a viewer is possible. The stereoscopic display device 100 stereoscopically displays an object by causing only a right eye of a viewer to observe an object image for a right eye in which the object is drawn and causing only a left eye of the viewer to observe an object image for a left eye in which the object is drawn.

A field of view L1 shown in FIG. 2 is a scope where the left eye LE can observe an image displayed on the display screen 200, and a field of view R1 is a scope where the right eye RE can observe the image displayed on the display screen 200. A region R11 is a region not included in the field of view L1 but included in the field of view R1, and a region L11 is a region not included in the field of view R1 but included in the field of view L1. A region L12 is a region included in both the field of view L1 and the field of view R1.

Accordingly, if the object 300 exists within the region L12, a viewer can view the object with both eyes (that is, stereoscopic viewing is possible), and so the stereoscopic display device 100 can stereoscopically display the object 300 in the region L12. Specifically, the stereoscopic display device 100 can stereoscopically display the object 300 by displaying an image reflected in the left eye LE and an image reflected in the right eye RE at the time of a viewer actually viewing the object 300 as the object image for a left eye and the object image for a right eye, respectively.

However, when the object 300 exists in the region L11 or the region R11, a viewer can view the object 300 only with one eye, and, thus, stereoscopic viewing of the object 300 becomes not possible or difficult. For example, in a case the object 300 exists at a position P1, the left eye LE can observe a part 300a of the object 300, but another part 300b is not observable. This is because the other part 300b exists outside the field of view L1. On the other hand, the right eye RE can observe the entire object 300. Similarly, in a case the object 300 exists at a position P2, the left eye LE can observe a part 300c of the object 300, but another part 300d is not observable. This is because the other part 300c exists outside the field of view L1. On the other hand, the right eye RE can observe the part 300c and the other part 300d of the object 300.

Accordingly, it becomes difficult for the stereoscopic display device 100 to stereoscopically display the object 300 in the region L11 or the region R11. Specifically, in the case the stereoscopic display device 100 stereoscopically displays the object 300 in the region L11 or R11, a non-matching portion occurs in one of the object image for a right eye and the object image for a left eye, the non-matching portion being a portion in which the object image of the other one of the object image for a right eye and the object image for a left eye is not drawn (does not match). In this manner, that one object image and the other object image "do not match" means that a certain part of an object is drawn in one object image but this certain part is not drawn in the other object image. Similarly, "to match" means that the same part of an object is drawn in both one object image and the other object image. That is, due to a parallax between the left and right eyes, the same part of an object is drawn differently for the object image for a right eye and the object image for a left eye, but such a case is treated not as "non-matching" but as "matching."

For example, in the case the stereoscopic display device 100 stereoscopically displays the object 300 at the position P1, the part 300a of the object 300 is drawn in the object image for a left eye but the other part 300b of the object 300 is not drawn therein. This is because, since the object image for a left eye extends to the right end of the display screen 200, the stereoscopic display device 100 is not able to display an image in which the other part 300b is drawn. On the other hand, the entire object 300 is drawn in the object image for a right eye. Thus, a non-matching portion that does not match the object image for a left eye, specifically, a part in which the other part 300b of the object 300 is drawn, exists in the object image for a right eye.

Similarly, in the case the stereoscopic display device 100 stereoscopically displays the object 300 at the position P2, the part 300c of the object 300 is drawn in the object image for a left eye but the other part 300d is not drawn therein. On the other hand, the part 300c and the other part 300d of the object 300 are drawn in the object image for a right eye. Thus, a non-matching portion that does not match the object image for a left eye, specifically, a part in which the other part 300d of the object 300 is drawn, exists in the object image for a right eye. That is, a non-matching portion occurs in a case at least one of the object image for a left eye and the object image for a right eye extends to one of the left and right end portions of the display screen 200 and only a part of an object is drawn (the entire object is not drawn) in such one of the object images.

Figure 3A:
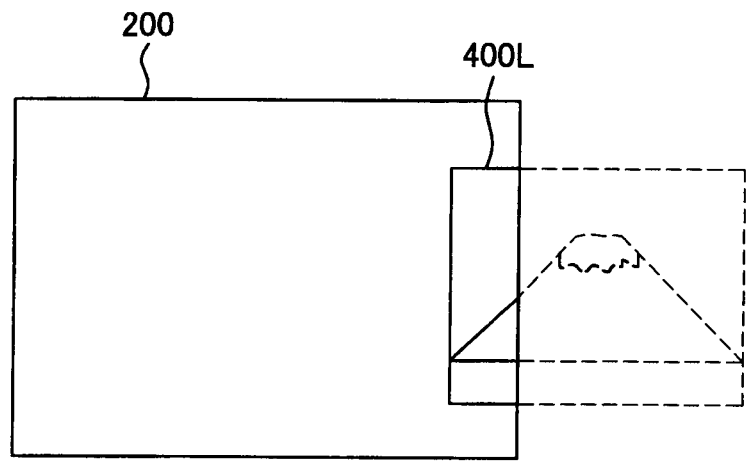
FIGS. 3A and 3B are explanatory diagrams showing a non-matching portion.
Figure 3B:
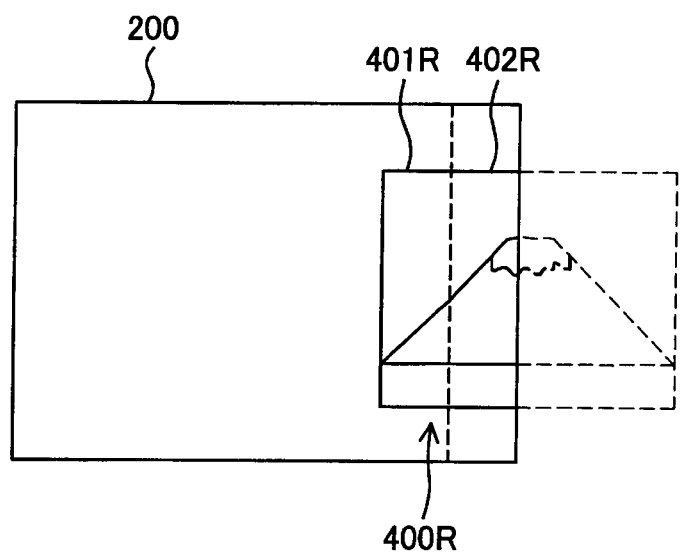

FIGS. 3A and 3B show concrete examples where a non-matching portion occurs. FIG. 3A shows an object image for a left eye 400L, and FIG. 3B shows an object image for a right eye 400R. In this example, the object image for a right eye 400R includes a matching portion 401R that matches the object image for a left eye 400L and a non-matching portion 402R that does not match the object image for a left eye 400L.

Such a non-matching portion is observed only by the right eye or the left eye of the viewer, and, thus, a parallax is not perceived by the viewer regarding the non-matching portion. Accordingly, a viewer possibly experiences an odd feeling towards the non-matching portion, and, further, towards the stereoscopic object image. For example, a viewer possibly feels that the stereoscopic object image is cut of at the non-matching portion.

Additionally, in the above explanation, the non-matching portion occurs when the object 300 is stereoscopically displayed forward out of the display screen 200, but the non-matching portion also occurs when the object 300 is stereoscopically displayed backward into the display screen 200 (on the side farther away from the viewer than the display screen 200). However, in this case, the viewer is allowed to feel that the stereoscopic object image is cut off by the outer frame of the display screen 200 (that is, the outer frame of the stereoscopic display device 100), and, thus, an odd feeling towards the stereoscopic object image can be reduced. However, when the object 300 is stereoscopically displayed forward out of the display screen 200, the stereoscopic object image is seen as if it is cut off despite there being no obstruction such as the outer frame of the display screen 200 around the object that is stereoscopically displayed. Accordingly, the viewer experiences an odd feeling more strongly in the case where the object 300 is stereoscopically displayed on the forward side than when it is displayed on the backward side, and, thus, the non-matching portion becomes an issue particularly in the case where the object 300 is stereoscopically displayed forward out of the display screen 200.

Figure 4A:
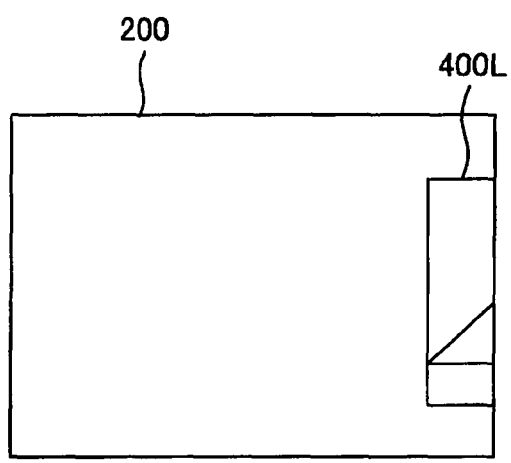
FIGS. 4A and 4B are explanatory diagrams for describing a floating window.
Figure 4B:
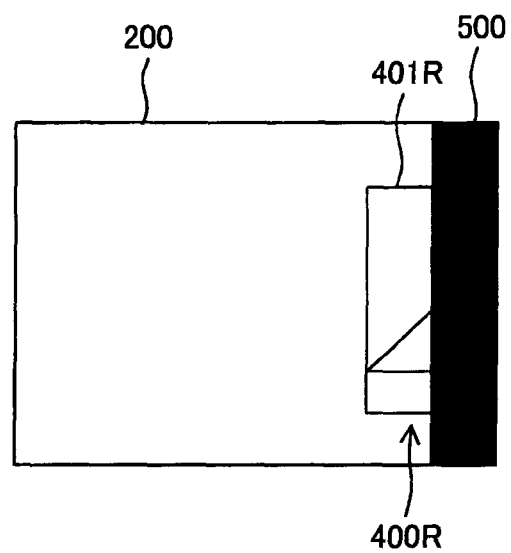

In relation to such an issue, the technology described in patent document 1 causes floating windows in which no object image is drawn to be displayed at the left and right end portion of the display screen 200. The non-matching portion will not be displayed owing to such floating windows, and a viewer can view the same object image with the left and right eyes. For example, as shown in FIGS. 4A and 4B, a floating window 500 is displayed at the right end portion of the display screen 200. This prevents a partial image 402R which is the non-matching portion from being displayed, and, thus, an odd feeling towards the stereoscopic object image is reduced.

However, a floating window is dark-coloured (for example, black), and if the surroundings of the stereoscopic display device 100 are bright (for example, if the stereoscopic display device 100 is placed in a bright room), there is a possibility that the floating window does not fit into the surroundings. Accordingly, there is a possibility that the viewer experiences an odd feeling towards the floating window.

Figure 5:
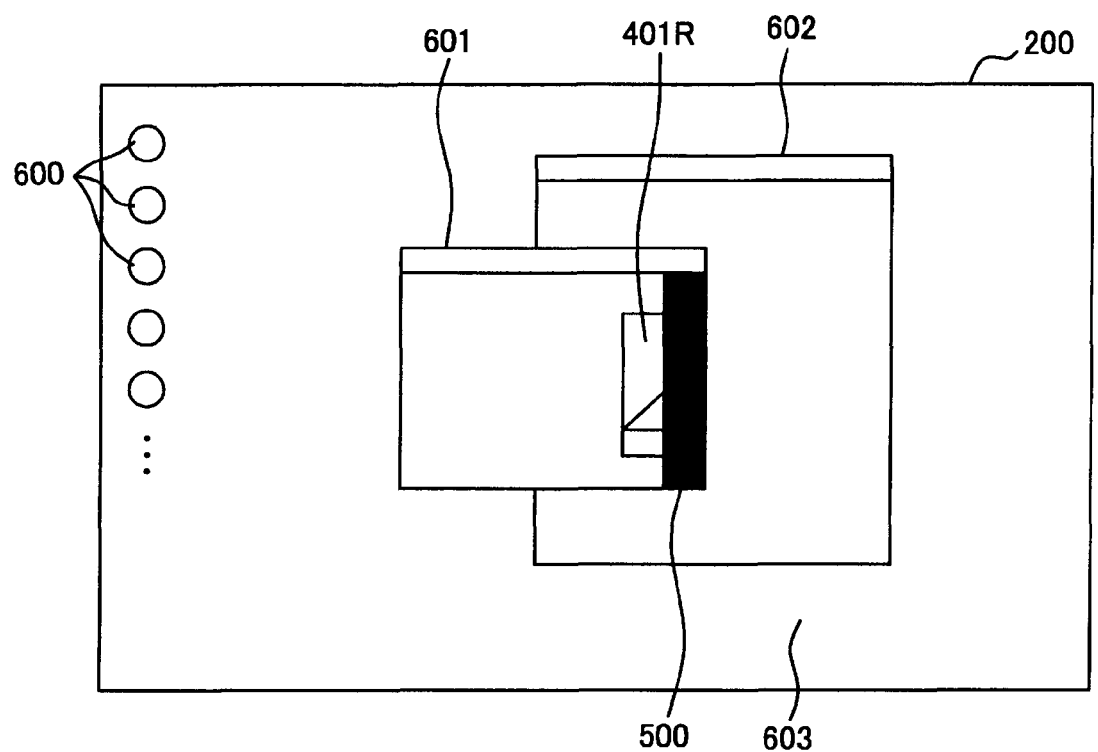
FIG. 5 is an explanatory diagram showing an example of using a part of a display screen for stereoscopic display of an object.

Also, in the future, a technology of using, for stereoscopic display of an image, not only the entire display screen, but also only a part of the display screen, as with a graphical user interface (GUI), will be conceivable. According to this technology, as shown in FIG. 5 for example, a display area (window) 601 for stereoscopically displaying an object is displayed on a part of the display screen 200, and various images (for example, a window 602 used for performing various operations, icons 600, a background image 603, and the like) are displayed on other parts thereof. In this case, the floating window 500 is displayed on either of the left and right end portions of the window 601 for stereoscopically displaying an object. Also in this case, since the floating window 500 does not fit in with the surrounding structures (other windows 602, the icons 600, the background image 603, and the like), the viewer will experience an odd feeling towards the floating window 500.

Accordingly, with the technology described in patent document 1, there is an issue that the viewer experiences an odd feeling towards the floating window.

Thus, display control devices 10 according to the first to fourth embodiments reduce an odd feeling towards a stereoscopic object image compared to the past without using the floating window. A detailed explanation will be given below.

<2. First Embodiment>

[Configuration of Display Control Device 10]

Figure 6:
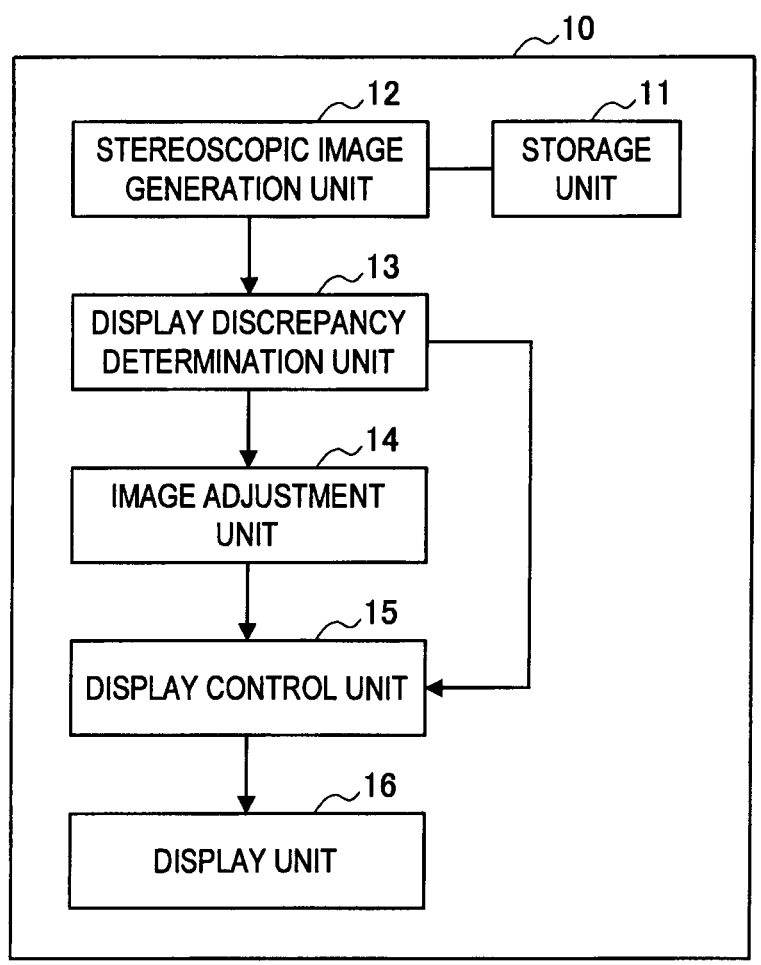
FIG. 6 is a block diagram showing a configuration of a display control device according to a first embodiment of the present disclosure.

First, a configuration of a display control device 10 will be described with reference to FIGS. 6, 8A and 8B. The stereoscopic display device 10 includes a storage unit 11, a stereoscopic image generation unit 12, a display discrepancy determination unit 13, an image adjustment unit 14, a display control unit 15, and a display unit 16.

The storage unit 11 stores image information including three-dimensional coordinates and scales (width and height) of various objects, positions of points of view (right eye and left eye) of a viewer, position of a display screen 20 of the display unit 16 (see FIGS. 8A and 8B), and the like. The three-dimensional coordinates indicate the position at which an object is to be stereoscopically displayed. For example, a z-axis is an axis perpendicular to the display screen 20, and indicates depth. An x-axis is an axis parallel to a long side of the display screen 20, and a y-axis is an axis parallel to a short side of the display screen 20. The position of an origin is arbitrary, but is at the centre of the display screen 20, for example. The width of an object is the length in the x-axis direction, and the height of the object is the length in the y-axis direction.

The stereoscopic image generation unit 12 generates an object image for a right eye and an object image for a left eye and determines their display positions on the display screen 20, by performing a known coordinate transformation process or the like on the image information stored in the storage unit 11. Here, the object image for a right eye is an image reflected on the right eye when a viewer actually views an object, and the object image for a left eye is an image reflected on the left eye when the viewer actually views the object. The stereoscopic image generation unit 12 outputs information related to the object image for a right eye, the object image for a left eye, and their display positions to the display discrepancy determination unit 13. Additionally, the display position is given as coordinates on the xy plane defined on the display screen 20. The origin of this xy plane is the left-top vertex of the display screen 20, for example, and the x-axis is parallel to the long side of the display screen 20 and rightward is the positive direction and the y-axis is parallel to the short side of the display screen 20 and downward is the positive direction.

The display discrepancy determination unit 13 determines whether a condition that at least one of the object image for a right eye and the object image for a left eye exceeds one of the left and right end portions of the display screen 200 is satisfied, based on the information provided by the stereoscopic image generation unit 12. That is, the display discrepancy determination unit 13 determines whether a condition that at least one of the object image for a right eye and the object image for a left eye extends to one of the left and right end portions of the display screen 200 and that only a part of an object is drawn (that the entire object is not drawn) in such one of the object images is satisfied. This is because, the non-matching portion occurs when this condition is satisfied.

The display discrepancy determination unit 13 further determines whether the object is to be stereoscopically displayed forward (on the side nearer to the viewer) out of the display screen 200 (the display positions of the object image for a right eye and the object image for a left eye).

The display discrepancy determination unit 13 outputs the information provided by the stereoscopic image generation unit 12 to the image adjustment unit 14 or the display control unit 15 depending on the result of the determination described above.

The image adjustment unit 14 specifies the non-matching portion of the object image for a right eye and the object image for a left eye based on information before adjustment which is the information provided by the display discrepancy determination unit 13.

Figure 8A:
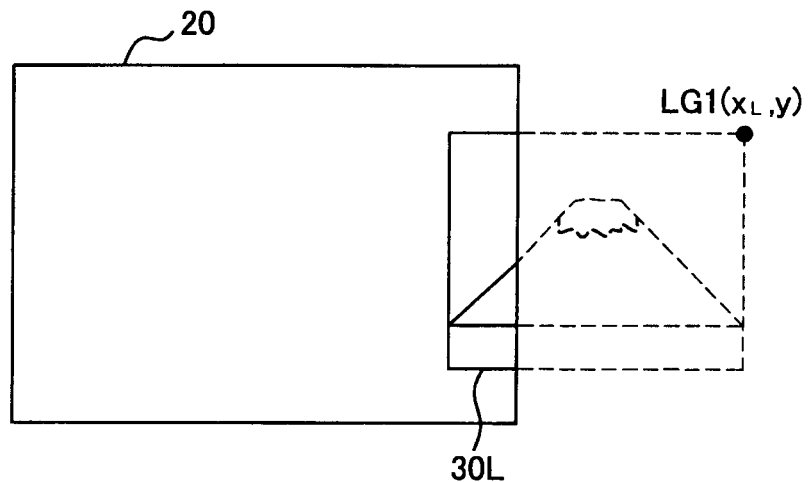
FIGS. 8A and 8B are explanatory diagrams showing examples of an object image for a right eye and an object image for a left eye displayed by the display control device according to the embodiment.
Figure 8B:
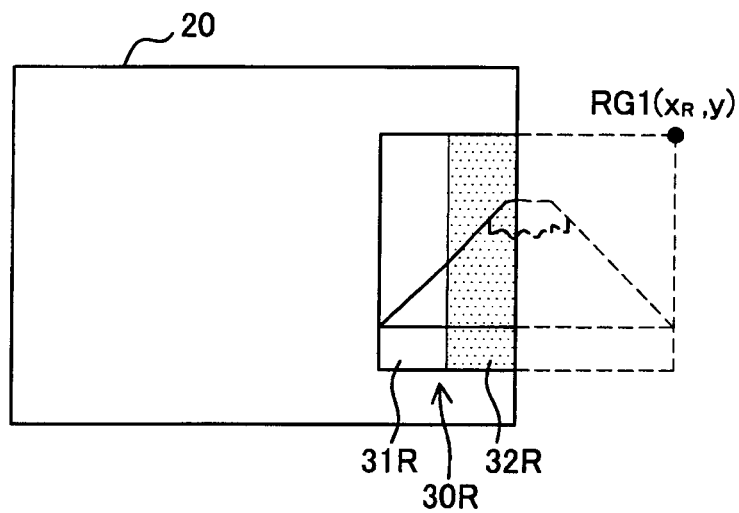

The method of specifying the non-matching portion by the image adjustment unit 14 will described here based on FIGS. 8A and 8B. FIG. 8A shows an object image for a left eye 30L, and FIG. 8B shows an object image for a right eye 30R. The object image for a right eye 30R includes a matching portion 31R and a non-matching portion 32R.

The image adjustment unit 14 generates an entire object image for a right eye which includes the object image for a right eye and in which the entire object is drawn. Then, the image adjustment unit 14 specifies an x-coordinate $x_R$ whose absolute value is the largest among x-coordinates of points of the entire object image for a right eye. A point RG1 having such x-coordinate $x_R$ is shown in FIG. 8B.

Similarly, the image adjustment unit 14 generates an entire object image for a left eye which includes the object image for a left eye and in which the entire object is drawn. Then, the image adjustment unit 14 specifies an x-coordinate $x_L$ whose absolute value is the largest among x-coordinates of points of the entire object image for a left eye. A point LG1 having such x-coordinate $x_L$ is shown in FIG. 8A.

Then, the image adjustment unit 14 compares the absolute values of the x-coordinate $x_L$ and the x-coordinate $x_R$, and when the absolute value of the x-coordinate $x_L$ is larger, determines that the non-matching portion exists in the object image for a right eye. Then, the image adjustment unit 14 takes, as the non-matching portion, a portion, in the object image for a right eye, where the x-coordinate falls within the range of $x_0-|x_L-x_R|$ and $x_0$. The $x_0$ here is an x-coordinate on the right end portion (short side on the right) of the display screen 20.

On the other hand, when the absolute value of the x-coordinate $x_R$ is larger, the image adjustment unit 14 determines that the non-matching portion exists in the object image for a left eye. Then, the image adjustment unit 14 takes, as the non-matching portion, a portion, in the object image for a left eye, where the x-coordinate falls within the range of $x_1$ and $x_L+|x_R|$. The $x_1$ here is an x-coordinate on the left end portion (short side on the left) of the display screen, i.e. zero.

Furthermore, the image adjustment unit 14 takes the non-matching portion as an adjustment target image which is a target of adjustment, and determines the transparency of the adjustment target image by any of methods (a) to (f) below. Additionally, the transparency after determination will be higher, by any of these methods, than that of a base image which is the adjustment target image before adjustment.

(a) The image adjustment unit 14 determines the transparency of the adjustment target image based on a setting common to any object and the three-dimensional coordinates and scale of the object. For example, the image adjustment unit 14 increases the transparency as the depth is less (nearer to the viewer) and the scale is larger.

(b) The image adjustment unit 14 determines the transparency of the adjustment target image base on a setting different for each object and the three-dimensional coordinates and scale of the object. For example, the image adjustment unit 14 increases the transparency as the depth is less (nearer to the viewer) and the scale is larger. Furthermore, the image adjustment unit 14 changes the transparency depending on the type of the object. For example, in the case the object is a tree, the image adjustment unit 14 increases the transparency than in the case the object is a car.

(c) The image adjustment unit 14 increases the transparency as the adjustment target image is larger.

(d) The image adjustment unit 14 increases the transparency as the area ratio between the adjustment target image and a matching portion (a portion where the object image for a right eye and the object image for a left eye match each other) is larger. The area ratio here is a value obtained by dividing an area Sm of the matching portion by an area Sn of the adjustment target image.

(e) The image adjustment unit 14 determines a transparency α based on an arbitrary function f(Sn) that takes the area Sn of the adjustment target image as a variable and on formula (1) below.

$$\alpha = f(Sn) \quad (1)$$

(f) The image adjustment unit 14 determines the transparency α based on an arbitrary function g(Sm/Sn) that takes an area ration Sm/Sn between the adjustment target image and the matching portion as a variable and on formula (2) below.

$$\alpha = g(Sm/Sn) \quad (2)$$

The image adjustment unit 14 makes the adjustment target image semi-transparent. That is, the transparency of the adjustment target image is corrected to the transparency which has been determined above. This makes the transparency of the adjustment target image higher than the transparency of the base image which is the adjustment target image before adjustment. In other words, the adjustment target image after adjustment is more transparent that the adjustment target image before adjustment.

For example, when the object image for a left eye 30L shown in FIG. 8A and the object image for a right eye 30R shown in FIG. 8B are provided, since the matching portion 31R and the non-matching portion 32R exist in the object image for a right eye 30R, the image adjustment unit 14 corrects the transparency of the non-matching portion 32R. Additionally, in FIG. 8B, the portion with increased transparency is shown by hatching.

The image adjustment unit 14 outputs the information before adjustment for which the transparency of the non-matching portion has been adjusted, that is, the information after adjustment, to the display control unit 15.

The display control unit 15 performs control of displaying the object image for a right eye and the object image for a left eye on the display screen 20 of the display unit 16 based on the information provided by the display discrepancy determination unit 13 or the image adjustment unit 14. That is, the display control unit 15 performs control of causing the object image for a right eye to be observed only by the right eye of the viewer and the object image for a left eye to be observed only by the left eye of the viewer. An object is thereby stereoscopically displayed. Additionally, the method of stereoscopically displaying an object may be any method such as an active shutter method, a patterning method, a parallax barrier method, a lenticular method, or the like. Additionally, the display control unit 15 also performs display control of a two-dimensional image. The two-dimensional image may be stored in the storage unit 11.

The display unit 16 is a display, for example, and includes the display screen 20. The display unit 16 displays the object image for a right eye and the object image for a left eye on the display screen 20 according to control by the display control unit 15.

[Steps of Process of Display Control Device 10]

Figure 7:
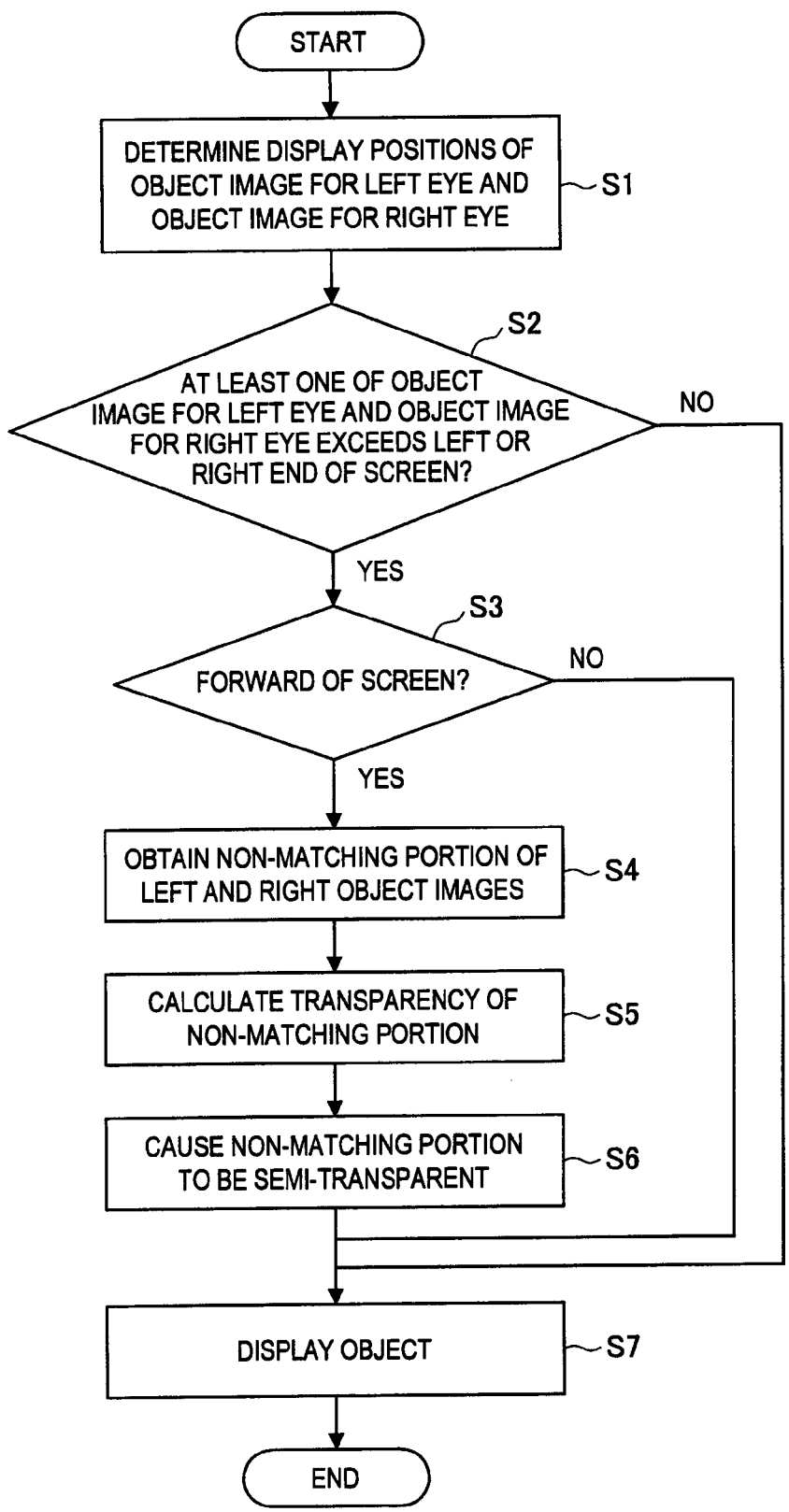
FIG. 7 is a flow chart showing steps of a process of the display control device according to the embodiment.

Next, steps of a process of the display control device 10 will be described along the flow chart shown in FIG. 7.

In step S1, the stereoscopic image generation unit 12 generates the object image for a right eye and the object image for a left eye based on the image information stored in the storage unit 11. Furthermore, the stereoscopic image generation unit 12 determines the display positions of the object image for a right eye and the object image for a left eye on the display screen 20. The stereoscopic image generation unit 12 outputs information related to the object image for a right eye, the object image for a left eye, and their display positions to the display discrepancy determination unit 13.

In step S2, the display discrepancy determination unit 13 determines whether a condition that at least one of the object image for a right eye and the object image for a left eye exceeds one of the left and right end portions of the display screen 200 is satisfied, based on the information provided by the stereoscopic image generation unit 12. That is, the display discrepancy determination unit 13 determines whether a condition that at least one of the object image for a right eye and the object image for a left eye extends to one of the left and right end portions of the display screen 200 and that only a part of an object is drawn (that the entire object is not drawn) in such one of the object images is satisfied.

The display discrepancy determination unit 13 proceeds to step S3 in the case this condition is satisfied, and proceeds to step S7 after outputting the information provided by the stereoscopic image generation unit 12 to the display control unit 15 in the case this condition is not satisfied.

In step S3, the display discrepancy determination unit 13 determines whether a condition that the object is to be stereoscopically displayed forward (on the side nearer to the viewer) out of the display screen 20 is satisfied. In the case this condition is satisfied, the display discrepancy determination unit 13 outputs the information provided by the stereoscopic image generation unit 12 to the image adjustment unit 14, and proceeds to step S4. On the other hand, in the case this condition is not satisfied, the display discrepancy determination unit 13 outputs the information provided by the stereoscopic image generation unit 12 to the display control unit 15, and proceeds to step S7.

In step S4, the image adjustment unit 14 specifies a non-matching portion of the object image for a right eye and the object image for a left eye based on the information provided by the display discrepancy determination unit 13.

In step S5, the image adjustment unit 14 takes the non-matching portion as an adjustment target image which is a target of adjustment, and determines the transparency of the adjustment target image by any of the methods (a) to (f) above.

In step S6, the image adjustment unit 14 makes the adjustment target image semi-transparent. That is, the image adjustment unit 14 corrects the transparency of the adjustment target image to the transparency determined above. This makes the adjustment target image after adjustment more transparent than the adjustment target image before adjustment.

The image adjustment unit 14 replaces information related to the non-matching portion, among the information provided by the stereoscopic image generation unit 12, by information with corrected transparency, and outputs the same to the display control unit 15.

In step S7, the display control unit 15 performs control of displaying the object image for a right eye and the object image for a left eye on the display screen 20 of the display unit 16 based on the information provided by the display discrepancy determination unit 13 or the image adjustment unit 14. That is, the display control unit 15 performs control of causing the object image for a right eye to be observed only by the right eye of the viewer and the object image for a left eye to be observed only by the left eye of the viewer. The object is thereby stereoscopically displayed.

In this manner, according to the first embodiment, when there is a non-matching portion, the display control device 10 takes the non-matching portion as the adjustment target image, and makes the transparency of the adjustment target image higher than that of a base image which is the adjustment target image before adjustment. This allows a viewer to perceive the non-matching portion to be fitted in with the surroundings compared to when the non-matching portion generated by the stereoscopic image generation unit 12 is displayed as it is, and, thus, an odd feeling towards the non-matching portion is reduced, and, further, an odd feeling towards the stereoscopic object image is also reduced.

Accordingly, the display control device 10 can reduce an odd feeling towards the stereoscopic object image compared to the past without using a floating window.

Furthermore, even if the surroundings of the display control device 10 are bright, the viewer can perceive the non-matching portion as if it is fitted in with the surroundings compared to when the non-matching portion is displayed as it is. Accordingly, even if a floating window does not fit in with the surroundings, the display control device 10 can reduce an odd feeling towards the stereoscopic object image compared to the past.

Furthermore, the display control device 10 can reduce an odd feeling towards the stereoscopic object image compared to the past in the case the object is stereoscopically displayed forward out of the display screen 20, that is, in the case the non-matching portion particularly becomes an issue.

Furthermore, with the technology described in patent document 1, the floating windows prevent object images to be displayed on the left and right end portions of the display screen 200. However, with the display control device 10, the floating window does not have to be displayed, and, thus, the display screen 20 can be used more widely than with the technology described in patent document 1.

First Modified Example

Next, a first modified example will be described. According to this modified example, the image adjustment unit 14 adjusts the intensity of blur instead of adjusting the transparency. That is, the image adjustment unit 14 takes the non-matching portion as an adjustment target image which is a target of adjustment, and determines the intensity of blur of the adjustment target image by a method same as any of the methods (a) to (f) above. Additionally, the intensity of blur after determination will be higher, by any of these methods, than that of a base image which is the adjustment target image before adjustment. Additionally, the blurring process of the adjustment target image is performed according to an existing algorithm such as a Gaussian filter. The same effects as the above can be obtained by this first modified example.

Second Modified Example

Figure 9:
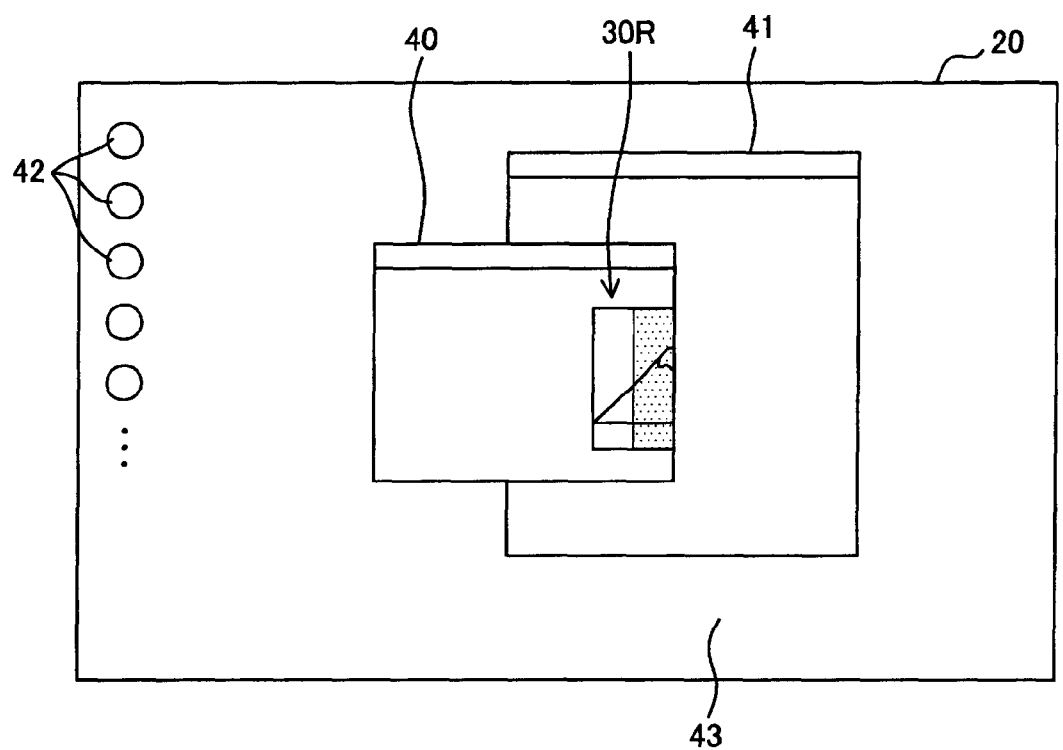
FIG. 9 is an explanatory diagram showing an example of an object image for a right eye displayed by a display control device according to a modified example of the embodiment.

Next, a second modified example will be described. According to this modified example, a part of the display screen 20 is used to stereoscopically display an object. A display example is shown in FIG. 9. In this example, a display area (window) 40 for stereoscopically displaying an object is displayed on a part of the display screen 20, and various images (for example, a window 41 used for performing various operations, icons 42, a background image 43, and the like) are displayed on other parts thereof. Display control for displaying these images is performed by the display control unit 15.

In such a case, a viewer perceives the non-matching portion as if it is fitted in with the surrounding structures (the window 41, the icons 42, the background image 43, and the like). Thus, the display control device 10 according to the second modified example can reduce an odd feeling towards a stereoscopic object image even in a case the floating window does not fit in with the surroundings.

<3. Second Embodiment>

Next, a second embodiment will be described. Additionally, only the parts different from the first embodiment will be described for the second embodiment and each embodiment described later.

Figure 10A:
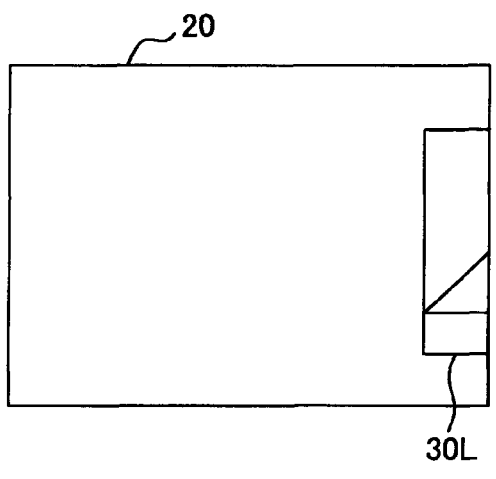
FIGS. 10A and 10B are explanatory diagrams showing examples of an object image for a right eye and an object image for a left eye displayed by a display control device according to a second embodiment.
Figure 10B:
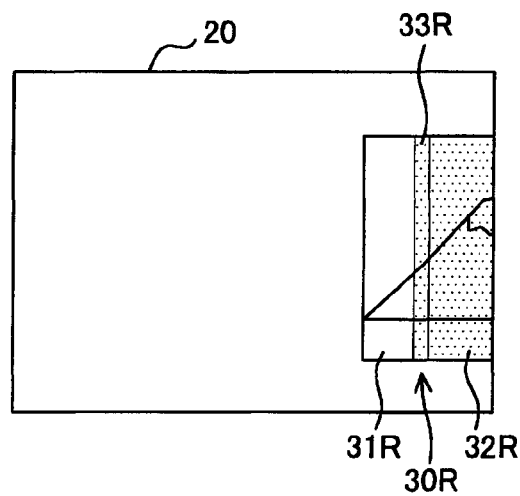

The image adjustment unit 14 takes, not only the non-matching portion, but also a portion, of the matching portion, adjacent to (near) the non-matching portion as the adjustment target image, and performs the same process as the first embodiment. Examples of the object image for a right eye and the object image for a left eye displayed by the second embodiment are shown in FIGS. 10A and 10B. FIG. 10A shows the object image for a left eye 30L, and FIG. 10B shows the object image for a right eye 30R. The object image for a right eye 30R includes the matching portion 31R and the non-matching portion 32R. As shown in FIG. 10B, not only the non-matching portion 32R, but also a portion 33R, in the matching portion 31R, adjacent to (near) the non-matching portion 32R is also transparent.

According to the second embodiment, the display control device 10 can make a portion, in the matching portion, adjacent to (near) the non-matching portion also fit in with the surroundings, and, thus, an odd feeling towards the stereoscopic object image can be reduced than in the first embodiment.

<4. Third Embodiment>

Next, a third embodiment will be described. According to the third embodiment, the image adjustment unit 14 takes, in a case a non-matching portion occurs, all of the object image for a right eye and the object image for a left eye as the adjustment target image. That is, image adjustment unit 14 makes all of the object image for a right eye and the object image for a left eye transparent. Examples of the object image for a right eye and the object image for a left eye displayed by the third embodiment are shown in FIGS. 11A and 11B. FIG. 11A shows the object image for a left eye 30L, and FIG. 11B shows the object image for a right eye 30R.

According to the third embodiment, the display control device 10 can make all of the object image for a right eye and the object image for a left eye fit in with the surroundings, and, thus, an odd feeling towards the stereoscopic object image can be reduced than in the first embodiment.

<5. Fourth Embodiment>

Figure 12A:
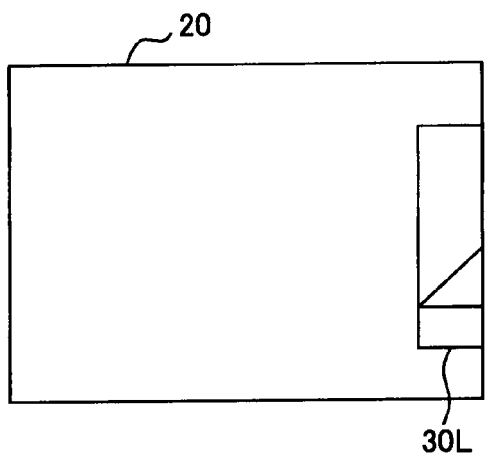
FIGS. 12A and 12B are explanatory diagrams showing examples of an object image for a right eye and an object image for a left eye displayed by a display control device according to a fourth embodiment.
Figure 12B:
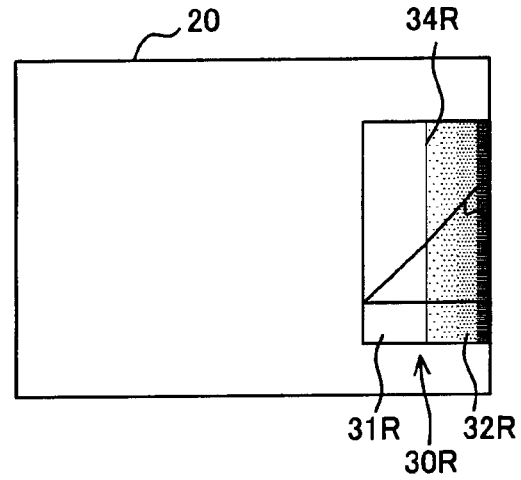

Next, a fourth embodiment will be described. According to the fourth embodiment, the image adjustment unit 14 increases the transparency of each section of the non-matching portion, that is, the adjustment target image, as the distance between the matching portion and each section (specifically, the distance from the boundary between the matching portion and the non-matching portion) becomes greater. Examples of the object image for a right eye and the object image for a left eye displayed by the fourth embodiment are shown in FIGS. 12A and 12B. FIG. 12A shows the object image for a left eye 30L, and FIG. 11B shows the object image for a right eye 30R. The object image for a right eye 30R includes the matching portion 31R and the non-matching portion 32R. As shown in FIG. 12B, the transparency of each section in the non-matching portion 32R is greater as the distance from a boundary 34R between the matching portion 31R and the non-matching portion 32R is greater. Additionally, in FIG. 12B, the level of transparency is indicated by the intensity of hatching.

According to the fourth embodiment, the display control device 10 can make each section in the non-matching portion better fit in with the surroundings as it is more separated from the matching portion, and, thus, an odd feeling towards the stereoscopic object image can be reduced than in the first embodiment.

<6: Hardware Configuration>

Figure 13:
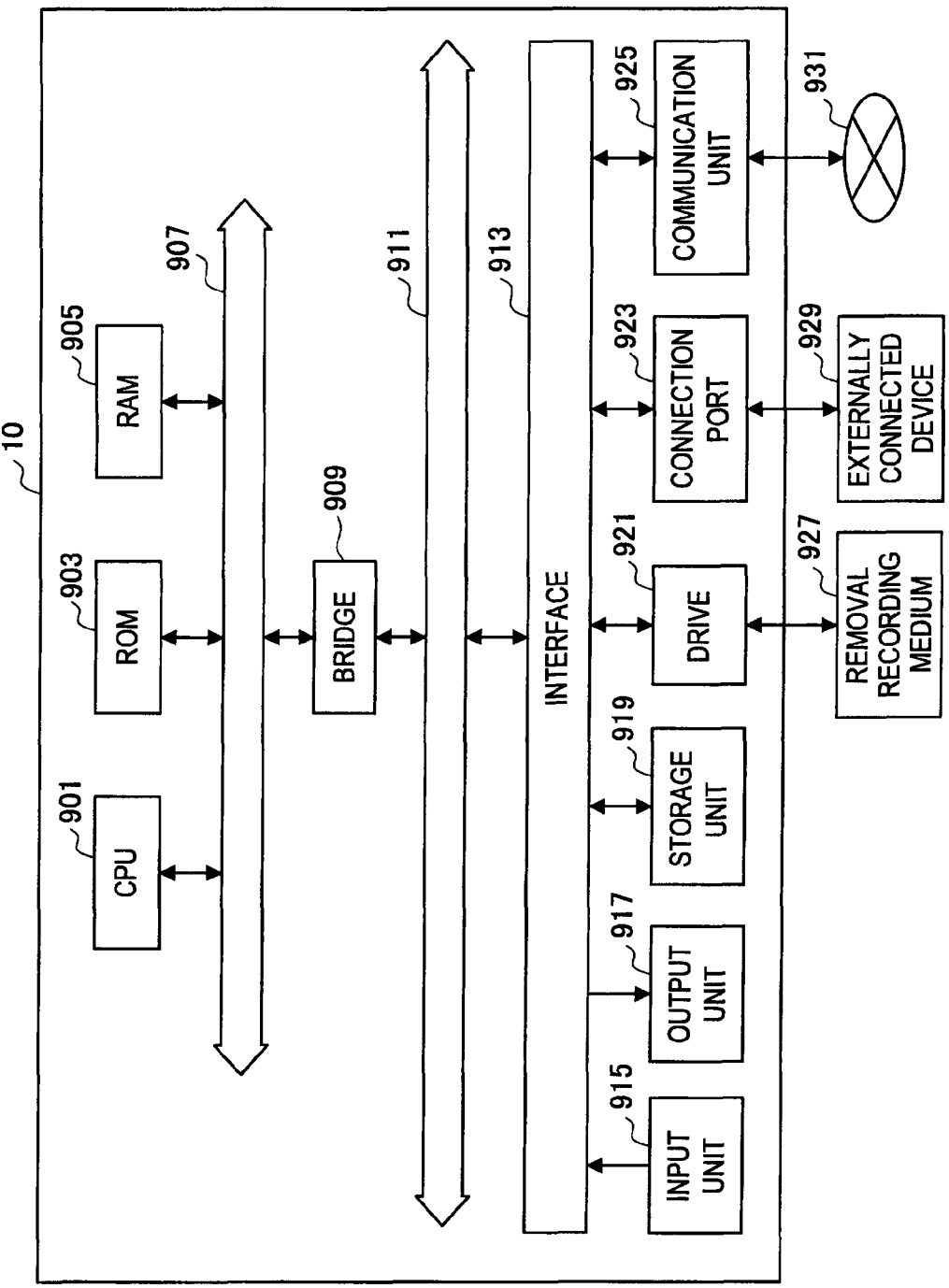
FIG. 13 is a block diagram showing an example of a hardware configuration of the display control devices according to the first to fourth embodiments.

Next, a hardware configuration of the display control device 10 according to the embodiment of the present disclosure will be described in detail with reference to FIG. 13. FIG. 13 is a block diagram for describing a hardware configuration of the display control device 10 according to the embodiment of the present disclosure.

The display control device 10 mainly includes a CPU 901, a ROM 903, and a RAM 905. Furthermore, the display control device 10 also includes a host bus 907, a bridge 909, an external bus 911, an interface 913, an input unit 915, an output unit 917, a storage unit 919, a drive 921, a connection port 923, and a communication unit 925.

The CPU 901 functions as an arithmetic processing unit and a control unit, and controls entire operation or a part of the operation of the display control device 10 according to various programs recorded on the ROM 903, the RAM 905, the storage unit 919, or a removable recording medium 927. The ROM 903 stores a program to be loaded on the CPU 901, arithmetic parameters, or the like. The RAM 905 primarily stores a program to be loaded on the CPU 901, parameters arbitrarily changed in execution of the program, or the like. These are connected to each other by the host bus 907 configured from an internal bus such as a CPU bus.

The host bus 907 is connected through the bridge 909 to the external bus 911 such as a PCI (Peripheral Component Interconnect/Interface) bus.

The input unit 915 is operation means operated by a user, such as a mouse, a keyboard, a touch panel, a button, a switch, or a lever, for example. Also, the input unit 915 may be remote control means that uses an infrared ray or other radio waves, or it may be an externally connected device 929 such as a mobile phone, a PDA or the like compatible with operation of the display control device 10, for example. Furthermore, the input unit 915 is configured from an input control circuit or the like that generates an input signal based on information input by a user using the operation means described above and that outputs the same to the CPU 901. A user of the display control device 10 can input various types of data to the display control device 10 or issue a processing operation by operating this input unit 915.

The output unit 917 is configured from a device capable of visually or auditorily notifying a user of acquired information. Such a device may be a display device such as a CRT display device, a liquid crystal display device, a plasma display device, an EL display device or a lamp, an audio output device such as speakers or headphones, a printer device, a mobile phone, a facsimile, or the like. The output device 917 outputs results obtained by various processes performed by the display control device 10, for example. Specifically, the display device displays, as text or image, results obtained by various processes performed by the display control device 10. For its part, the audio output device converts an audio signal formed from audio data, acoustic data or the like which has been reproduced into an analog signal and outputs the same.

The storage unit 919 is a device for storing data configured as an example of a storage unit of the display control device 10. The storage device 919 is configured from a magnetic storage device such as a hard disk drive (HDD), a semiconductor storage device, an optical storage device, a magneto-optical storage device, or the like, for example. This storage unit 919 stores a program to be loaded on the CPU 901, various types of data, and acoustic signal data, image signal data or the like that is externally acquired.

The drive 921 is a reader/writer for a recording medium, and is embedded or externally attached to the display control device 10. The drive 921 reads information recorded on the attached removable recording medium 927 such as a magnetic disk, an optical disk, a magneto-optical disk, or a semiconductor memory, and outputs the same to the RAM 905. The drive 921 can also write a record on the attached removable recording medium 927 such as a magnetic disk, an optical disk, a magneto-optical disk, or a semiconductor memory. The removable recording medium 927 is a DVD medium, an HD-DVD medium, a Blu-ray medium, or the like, for example. The removable recording medium 927 may also be a CompactFlash (CF; registered trademark), a flash memory, a Secure Digital (SD) memory card, or the like. The removable recording medium 927 may also be an electronic appliance or an integrated circuit (IC) card on which a non-contact IC chip is mounted, or the like.

The connection port 923 is a port for directly connecting an appliance to the display control device 10. Examples of the connection port 923 include a Universal Serial Bus (USB) port, an IEEE1394 port, a Small Computer System Interface (SCSI) port, and the like. Other examples of the connection port 923 include an RS-232C port, an optical audio terminal, a High-Definition Multimedia Interface (HDMI) port, and the like. By connecting the externally connected device 929 to this connection port 923, the display control device 10 acquires acoustic signal data or image signal data directly from the externally connected device 929 or provides acoustic signal data or image signal data to the externally connected device 929.

The communication unit 925 is a communication interface configured from a communication device or the like for connecting to a communication network 931, for example. The communication unit 925 is a communication card for a wired or wireless Local Area Network (LAN), Bluetooth (registered trademark), a wireless USB (WUSB), or the like, for example. The communication unit 925 may also be an optical communication router, an Asymmetric Digital Subscriber Line (ADSL) router, a modem for various types of communication, or the like. This communication unit 925 can exchange signals or the like with the Internet or other communication appliances, for example, according to a predetermined protocol such as TCP/IP or the like. Also, the communication network 931 connected to the communication unit 925 is configured from a wire-connected or wirelessly connected network, or the like, and it may be the Internet, a home-use LAN, infrared communication, radio wave communication, satellite communication, or the like, for example.

In the foregoing, an example of the hardware configuration capable of realizing the function of the display control device 10 according to the embodiment of the present disclosure has been described. Each structural element described above may be configured from a general-purpose material or may be configured from hardware dedicated to the function of each structural element. Accordingly, hardware configuration to be used may be changed as appropriate according to the level of technology at the time of carrying out the embodiment.

It should be understood by those skilled in the art that various modifications, combinations, sub-combinations and alterations may occur depending on design requirements and other factors insofar as they are within the scope of the appended claims or the equivalents thereof.

For example, in each of the embodiments described above, adjustment by the image adjustment unit 14 is assumed to be performed in a case an object is stereoscopically displayed forward out of the display screen 20, but the present disclosure is not limited to such an example. That is, adjustment by the image adjustment unit 14 may be performed also in a case an object is stereoscopically displayed backward into the display screen 20. Furthermore, the embodiments described above may be combined with each other. Also, increasing the transparency or the intensity of blur of the non-matching portion has been presented as an example of making the non-matching portion unclear, but the non-matching portion may be coloured by being covered with a single-colour filter and the intensity of the color may be adjusted by a similar method as the methods (a) to (f) described above.

The present disclosure is applicable to a device for stereoscopically displaying an object.

The present disclosure contains subject matter related to that disclosed in Japanese Priority Patent Application JP 2010-200152 filed in the Japan Patent Office on Sep. 7, 2010, the entire content of which is hereby incorporated by reference.

What is claimed is:

1. A display control device comprising:
an image adjustment unit for taking, in a case one object image among an object image for a right eye to be observed by a right eye of a viewer and an object image for a left eye to be observed by a left eye of the viewer includes a non-matching portion not matching an other object image, the non-matching portion as an adjustment target image that is a target of adjustment, and adjusting the adjustment target image to be an image less clear than a base image that is the adjustment target image before adjustment; and a display control unit for performing control of stereoscopically displaying an object based on an object image after adjustment that is the one object image that has been adjusted by the image adjustment unit and the other object image, wherein the image adjustment unit adjusts the adjustment target image to be an image less clear than the base image by causing at least one of transparency and intensity of blur of the adjustment target image to be greater than that of the base image.

2. The display control device according to claim 1, wherein the image adjustment unit adjusts the adjustment target image in a case the object is stereoscopically displayed on a side nearer to the viewer than display positions of the object image after adjustment and the other object image.

3. The display control device according to claim 1, wherein the image adjustment unit increases a degree of unclearness of each section in the adjustment target image as a distance to the each section from a matching portion, in the one object image, matching the other object image is greater.

4. The display control device according to claim 1, wherein the image adjustment unit includes, in the adjustment target image, at least a part of a matching portion, in the one object image, matching the other object image.

5. The display control device according to claim 4, wherein the image adjustment unit includes, in the adjustment target image, a portion, in the matching portion, near the non-matching portion.

6. The display control device according to claim 4, wherein the image adjustment unit includes, in the adjustment target image, all of the one object image and the other object image.

7. A display control method comprising:

taking, in a case one object image among an object image for a right eye to be observed by a right eye of a viewer and an object image for a left eye to be observed by a left eye of the viewer includes a non-matching portion not matching an other object image, the non-matching portion as an adjustment target image that is a target of adjustment, and adjusting, using a processor, the adjustment target image to be an image less clear than a base image that is the adjustment target image before adjustment; and performing, using the processor, control of stereoscopically displaying an object based on an object image after adjustment that is the one object image that has been adjusted and the other object image, wherein the adjustment target image is adjusted to be an image less clear than the base image by causing at least one of transparency and intensity of blur of the adjustment target image to be greater than that of the base image.

8. The display control method according to claim 7, wherein the adjustment target image is adjusted in a case the object is stereoscopically displayed on a side nearer to the viewer than display positions of the object image after adjustment and the other object image.

9. The display control method according to claim 7, wherein a degree of unclearness of each section in the adjustment target image is increased as a distance to the each section from a matching portion, in the one object image, matching the other object image is greater.

10. The display control method according to claim 7, wherein the adjustment target image includes at least a part of a matching portion, in the one object image, matching the other object image.

11. The display control method according to claim 10, wherein the adjustment target image includes a portion, in the matching portion, near the non-matching portion.

12. The display control method according to claim 10, wherein the adjustment target image includes all of the one object image and the other object image.

13. A non-transitory computer-readable medium having embodied thereon a program, which when executed by a computer causes the computer to execute a method, the method comprising:

taking, in a case one object image among an object image for a right eye to be observed by a right eye of a viewer and an object image for a left eye to be observed by a left eye of the viewer includes a non-matching portion not matching an other object image, the non-matching portion as an adjustment target image that is a target of adjustment, and adjusting the adjustment target image to be an image less clear than a base image that is the adjustment target image before adjustment; and performing control of stereoscopically displaying an object based on an object image after adjustment that is the one object image that has been adjusted and the other object image, wherein the adjustment target image is adjusted to be an image less clear than the base image by causing at least one of transparency and intensity of blur of the adjustment target image to be greater than that of the base image.

14. The non-transitory computer-readable medium according to claim 13, wherein, in the method, the adjustment target image is adjusted in a case the object is stereoscopically displayed on a side nearer to the viewer than display positions of the object image after adjustment and the other object image.

15. The non-transitory computer-readable medium according to claim 13, wherein, in the method, a degree of unclearness of each section in the adjustment target image is increased as a distance to the each section from a matching portion, in the one object image, matching the other object image is greater.

16. The non-transitory computer-readable medium according to claim 13, wherein, in the method, the adjustment target image includes at least a part of a matching portion, in the one object image, matching the other object image.

17. The non-transitory computer-readable medium according to claim 16, wherein, in the method, the adjustment target image includes a portion, in the matching portion, near the non-matching portion.

18. The non-transitory computer-readable medium according to claim 16, wherein, in the method, the adjustment target image includes all of the one object image and the other object image.

* * * * *